Feb. 29, 1944.　　J. H. BLANKENBUEHLER　　2,342,720

WELDING GENERATOR

Filed May 10, 1941

WITNESSES:
E. A. McCloskey.
F. V. Giolma

INVENTOR
John H. Blankenbuehler.
BY
J. M. Crawford
ATTORNEY

Patented Feb. 29, 1944

2,342,720

UNITED STATES PATENT OFFICE 2,342,720

WELDING GENERATOR

John H. Blankenbuehler, Edgewood, Pa., assignor to Westinghouse Electric & Manufacturing Company, East Pittsburgh, Pa., a corporation of Pennsylvania Application May 10, 1941, Serial No. 392,861

2 Claims. (Cl. 171—227)

My invention relates, generally, to generators and it has reference in particular to means for controlling the output of welding generators of the cross-field type or the like.

Generally stated, it is an object of my invention to provide in a simple and effective manner for more effectively controlling the output of a generator over a wide range of values of output.

More specifically, it is an object of my invention to provide for varying the impedance of the close-circuited auxiliary brush circuit of a generator of the cross-field type having a magnetic shunt output control, in order to vary the slope of the volt ampere curve for a given value of welding current under different welding conditions.

Another object of my invention is to provide for stabilizing the current in the armature excitation circuit of a welding generator of the cross-field type so as to prevent undesirable current undershoot during the transient period between short circuit and steady state conditions and maintain a stable arc while welding, particularly in the lower ranges of welding currents.

A further object of my invention is to provide for increasing the ratio of short circuit current to welding current in a welding generator so as to assist in maintaining a welding arc when welding in deep grooves or in over head positions.

Yet another object of my invention is to provide for reducing the fluctuations which normally occur in the welding current subsequent to a short circuit before the welding current regains its steady state condition.

Still another object of my invention is to provide for varying the output of a generator of the cross-field type by controlling the magnetic leakage flux thereof and varying load characteristics for a given output by varying the impedance of the auxiliary brush short circuit to secure different ratios of short circuit current to welding current under different welding conditions.

A yet further object of my invention is to provide for varying the output characteristics of a generator of the cross-field type so as to make it possible to secure a plurality of volt-ampere or load characteristic curves having different slopes for a given value of load current.

Other objects will in part be obvious, and will in part be explained hereinafter.

In accordance with my invention the output and load characteristics of a welding generator of the cross-field type may be controlled by utilizing an adjustable impedance connected between the normally short-circuited auxiliary brush for varying the current producing the main or cross-field flux, in conjunction with an adjustable magnetic shunt member which varies the magnetic field leakage flux of the generator. By cooperative adjustment of the adjustable impedance and the adjustable magnetic shunt member the output and characteristics of the generator may be so varied as to secure a plurality of different volt-ampere or output characteristic curves having different slopes for the same values of welding current. Different ratios between the short circuit current and the welding current may thus be provided for any given value of welding current, facilitating greatly welding under a relatively wide range of different conditions.

For a more complete understanding of the nature and scope of my invention reference may be had to the following detailed description, which may be read in connection with the accompanying drawing in which, Figure 1 is a partly schematic asymmetric view, broken out in part, of a generator embodying the principal features of the invention;

Figure 1:
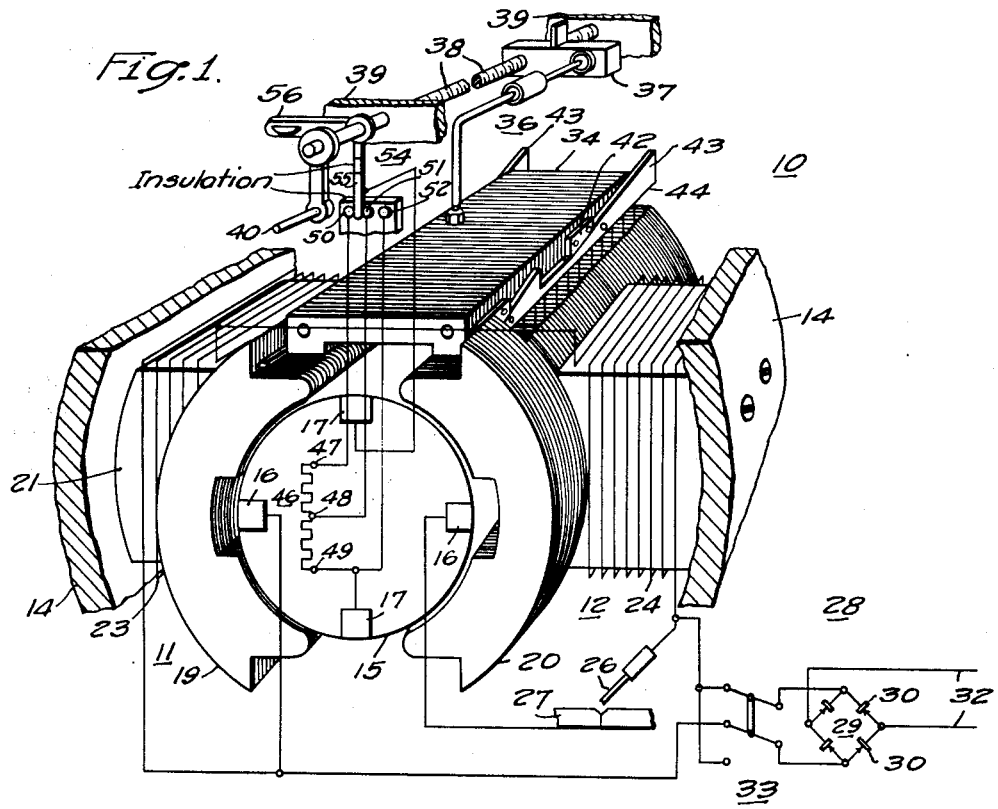

Referring to Fig. 1, the reference numeral 10 may denote, generally, a generator of the cross-field type having oppositely positioned field pole members 11 and 12, positioned within a frame 14 and having an armature 15 rotatively positioned therebetween. The armature 15 may be provided with a pair of main or load circuit brushes 16 and a pair of auxiliary or armature excitation circuit brushes 17 positioned along axes substantially at right angles to each other as shown. The field pole members 11 and 12 may be provided with arcuate shoe portions 19 and 20 adjacent the armature 15 and body portions 21 and 22, respectively, and having suitable field windings 23 and 24 thereon for producing magnetic fluxes therein. The field windings 23 and 24 may, for example, be connected in series circuit relation with the main brushes 16 and the load, which is represented as comprising a welding electrode 26 and work 27 upon which a welding operation is to be performed. It will now be apparent that the auxiliary brushes 17 are positioned at substantially the points of maximum potential so far as the series field windings are concerned. The main brushes 16 are positioned at substantially the points of minimum potential relative to the series field windings, which points are substantially the points of maximum potential for the cross-field flux produced by the armature excitation circuit.

In order to provide for controlling the polarity of the residual magnetism in the body portions 21 and 22 of the field pole members 11 and 12, so as to control the terminal polarity of the generator, suitable polarity control means 28 may be provided. For example, a bridge circuit 29 of unidirectional current devices 30 may be connected by means of conductors 32 to a suitable source of alternating current. The direct current terminals of the bridge circuit may be connected across the field pole windings 23 and 24 by means of a reversing switch 33 so that the polarity of the direct current windings may be reversed at the operator's will to control the terminal polarity of the generator between the electrode 26 and work 27.

For the purpose of adjusting the output of the generator so as to predetermine the welding current under a given set of welding conditions, suitable means may be provided for varying the reluctance of the path of the magnetic leakage flux, particularly between the arcuate shoe members 19 and 20 of the field pole members 11 and 12. For example, as described in my copending application Serial No. 280,687, filed June 23, 1939, a movable magnetic shunt member 34 may be positioned in bridged relation between the adjacent portions of the shoe members 19 and 20 and operatively connected by suitable connecting means 36 to a movable nut 37 threadably positioned on a rotatable threaded shaft 38, which may be supported in suitable bearing members 39 in the frame 14 and provided with a handle 40. The magnetic shunt member 34 may be supported relative to the arcuate shoe members 19 and 20 in any suitable manner, being, for example, supported thereon by means of bearing members 42 on the shunt member which may rest upon the sloping support surfaces 43 of guide members 44, secured to the arcuate shoe members. The sloping or inclined support surfaces 43 may have any desired shape, being either plane or curved as desired, so as to impart different compound motions to the magnetic shunt member 34 in response to linear movement of the nut 37 along the threaded shaft 38 when it is rotated by the handle 40.

Figure 5:
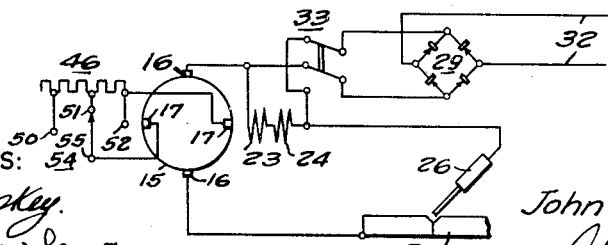
Fig. 5 is a diagrammatic view of an arc welding system embodying the invention.

In order to provide for varying the slopes of the different volt-ampere or load characteristic curves of the generator to suit different welding conditions, means may be provided for connecting an adjustable impedance 46 between the auxiliary brushes 17 as shown in Figs. 1 and 5. The impedance 46 may, for example, be provided with a plurality of taps 47, 48 and 49 which may be connected to contact members 50, 51 and 52, respectively, of a control switch 54. The control switch 54 may be provided with a movable contact member 55 for engaging the contact members, and which may be actuated by an operating lever 56 rotatably mounted on the shaft 38 of the magnetic shunt operating means. The contact members may be insulated from the frame or other support means in any well known manner. By connecting the tap 49 to one of the auxiliary brushes 17, and the movable contact member 55 to the other of the auxiliary brushes, the amount of the impedance 46 connected between the auxiliary brushes may be varied as desired.

Figure 2:
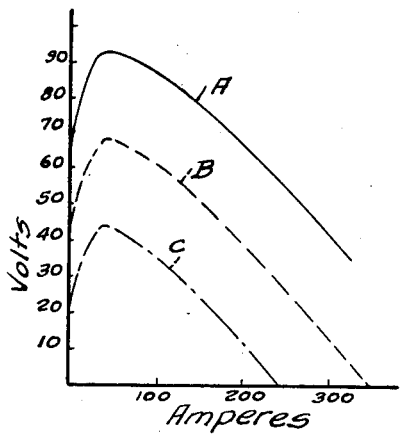
Figure 2 shows a plurality of volt-ampere or load characteristic curves illustrating the method of varying the output characteristics of the generator of Fig. 1 by varying the impedance of the auxiliary brush circuit.

Referring to Fig. 2, the letters A, B and C may denote different volt-ampere or load characteristic curves of the generator of Figs. 1 and 5 without any of the impedance 46 connected between the auxiliary brushes, with one-half of the impedance connected therebetween and with all of the said impedance connected therebetween, respectively, and with the magnetic shunt member positioned to the extreme rear as viewed in Fig. 1, or in the position of maximum output.

Figure 3:
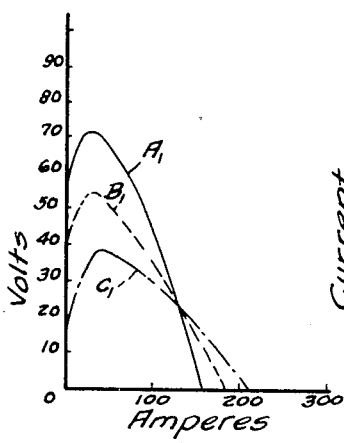
Fig. 3 shows another set of volt-ampere curves illustrating variations in the output characteristic which may be secured for a given value of current in practicing the invention.

The curves $A_1$, $B_1$ and $C_1$ of Fig. 3 may denote, respectively, different volt-ampere-curves of different slopes for a given value of current and voltage produced by cooperatively operating the magnetic shunt member and the impedance control switch 54. With the control switch 54 in each of the three positions, the shunt member 34 may be operated to secure different sets of curves such as shown. The curves shown intersect at a common point which is in the neighborhood of 23 volts and 119 amperes, and may be taken as representative of the different output characteristics which may be secured by means of cooperatively adjusting the magnetic shunt member and the impedance, for almost any value of welding current and arc voltage within the welding range of the generator. It will be noted that the curve $A_1$ is relatively steep, while the curve $B_1$ is somewhat less steep, and the curve $C_1$ is relatively flat. Similar sets of curves may be produced for other values of current and voltage. The ratios of the short circuit currents to welding current for each of these curves vary over a relatively wide range, so that the characteristics of the generator may be suitably adjusted to meet different welding conditions. For example, where welding overhead or in a relatively deep groove where the arc is more likely to become extinguished, the characteristics of the generator may, for example, be changed so as to assimilate the load conditions illustrated by the curve $C_1$. Should the arc tend to be extinguished by a momentary short circuit caused, for example, by a globule of molten weld metal bridging the gap between the electrode and the work or by the weld rod or electrode itself contacting the work, the welding current will be considerably increased. Such an increase in the welding current under these conditions tends to free the molten globule of weld metal from the load or melt away a portion of the weld rod or electrode so as to free it from the work, thus maintaining the arc.

Figure 4:
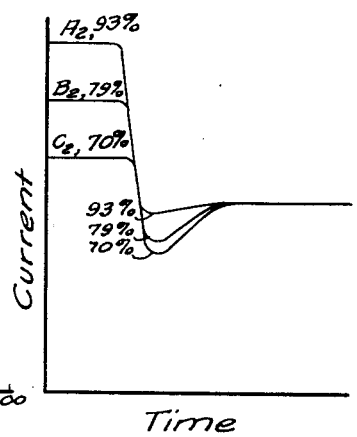
Fig. 4 represents a plurality of oscillographic curves illustrating the current characteristics of the generator under welding conditions for different values of impedance in the auxiliary brush circuit and different magnetic shunt settings.

Referring to Fig. 4, it will be seen that additional benefits may be secured by the connection of the impedance in the auxiliary brush circuit in the manner herebefore described. In this figure the letters $A_2$, $B_2$ and $C_2$ denote reproductions of oscillographic curves representative of the transient operating conditions in going from short circuit to normal welding conditions, with the impedance control switch and magnetic shunt member adjusted to produce output characteristics such as represented by the curves A, B, and C, respectively, of Fig. 3. It will be noted that during the transition period from the short circuit value of current to the steady state value of welding current, the current tends to dip or undershoot considerably in some instances below the steady state value, before the steady state value is reached. The percentages indicated adjacent the corresponding curves indicate the average values of the minimum currents during the transition period relative to the steady state value of welding current.

Thus, it will be seen that when either part or all of the impedance is inserted in the auxiliary brush circuit, not only may a variety of different ratios between the short circuit currents and welding current be secured for different values of welding current, but the amount of dip or undershoot of the current during the transition period from short circuit to steady state welding current may be controlled. For example, with the magnetic shunt member adjusted for 115 amperes at 20 volts and none of the impedance connected between the auxiliary brushes, the current reached a minimum value of approximately 70% of the final steady state welding current during the transition period. With one-half of the impedance connected between the auxiliary brushes the minimum value of current during the transition period was raised to 79% of the steady state welding current, and with all the impedance inserted the minimum value was not less than 93% of the steady state welding current. Thus by inserting more of the impedance in the auxiliary brush circuit improved current characteristics may be secured and the current dip or undershoot may be minimized.

From the above description and accompanying drawing it will therefore be apparent that I have provided in a simple and effective manner for improving the welding characteristics of generators of the cross-field type. By utilizing an adjustable impedance in the manner described, not only may different output characteristics be secured so as to improve the welding performance under different conditions but a stabilizing effect is also secured which greatly reduces the undershoot of welding current during the transition period between short circuit and normal welding conditions which is particularly effective in the lower range of welding currents where it is most beneficial. Maintenance of the welding arc is thus greatly facilitated.

Since certain changes may be made in the above description and different embodiments of the invention may be made without departing from the spirit thereof, it is intended that all the matter contained in the above description or shown in the accompanying drawing shall be considered as illustrative and not in a limiting sense.

I claim as my invention:

1. A generator comprising, a pair of oppositely positioned field pole members having field windings thereon, an armature rotatably disposed between the field pole members having main and auxiliary brushes, said main brushes being positioned along the axes of the field pole members and said auxiliary brushes being positioned along an axis at right angles thereto at substantially the points of maximum potential produced by the field winding flux, an adjustable magnetic shunt member positioned between the field pole members to vary the magnetic leakage flux therebetween and vary the output of the generator, and an impedance adjustable to different predetermined fixed values independently of the load current connected between the auxiliary brushes and cooperative with the shunt member to produce different predetermined ratios of short circuit current to load current for a given value of load current and voltage.

2. The combination with a generator having a pair of field pole members with field excitation windings, an armature rotatably positioned between the field pole members having main brushes connected to the field excitation windings and auxiliary brushes positioned at right angles thereto along the axis of maximum potential relative to the field excitation windings, and magnetic shunt means positioned between the field pole members to vary the leakage flux therefrom, of an impedance, and switch means operable to different fixed operating positions independently of the load current to connect different parts of the impedance between the auxiliary brushes to produce different predetermined slopes of the volt-ampere curve for given values of load current.

JOHN H. BLANKENBUEHLER.